A. A. LITTLE.
STOP SIGNAL FOR AUTOMOBILES.
APPLICATION FILED SEPT. 11, 1917.
1,290,601.
Patented Jan. 7, 1919.
2 SHEETS—SHEET 1.
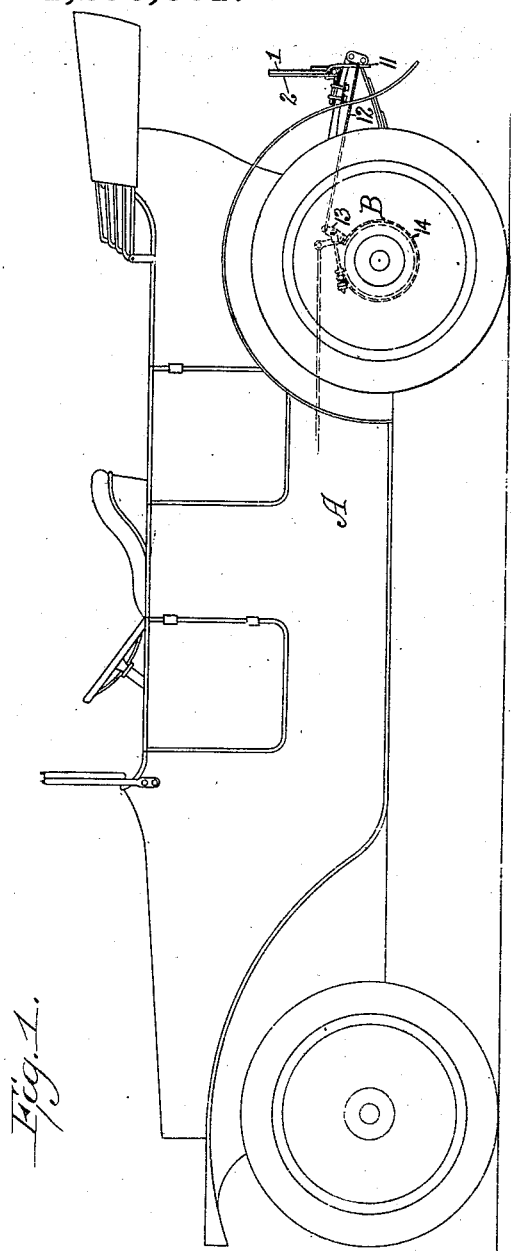
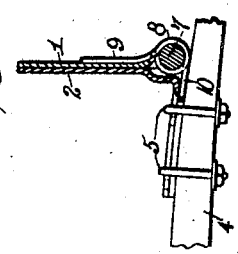
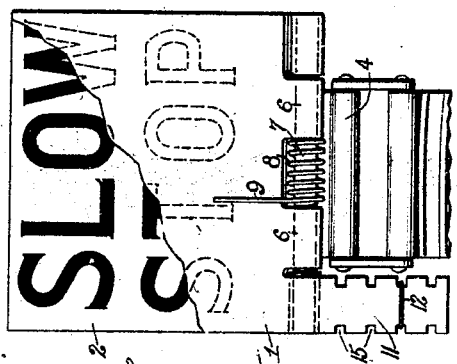
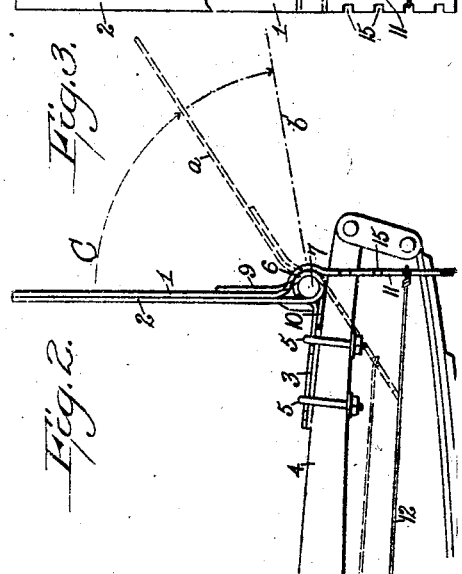
WITNESSES
INVENTOR
A. A. Little
BY
ATTORNEYS

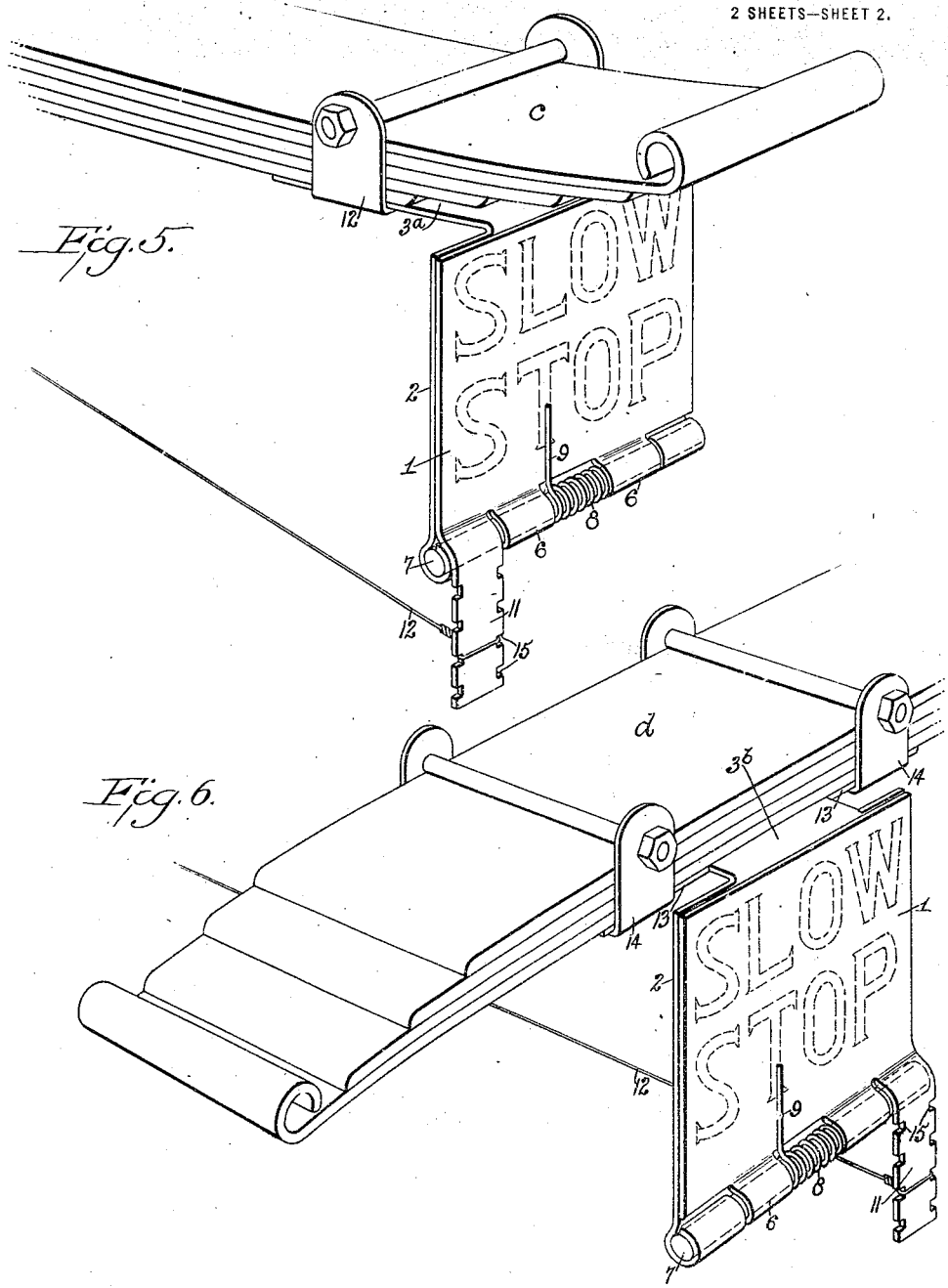

UNITED STATES PATENT OFFICE.

ALFRED A. LITTLE, OF NEW YORK, N. Y.

STOP-SIGNAL FOR AUTOMOBILES.

1,290,601. Specification of Letters Patent. Patented Jan. 7, 1919.

Application filed September 11, 1917. Serial No. 190,815.

*To all whom it may concern:*

Be it known that I, ALFRED A. LITTLE, a citizen of the United States, and a resident of the city of New York, borough of Manhattan, in the county and State of New York, have invented a new and Improved Stop-Signal for Automobiles, of which the following is a full, clear and exact description.

This invention relates to stop signals adapted to be applied to automobiles, whereby a following car can determine whether or not the car ahead is slowing down or stopping.

The invention has for its general objects to improve signal devices of the character referred to so as to be reliable and efficient in use, comparatively simple and inexpensive to manufacture, and so designed as to automatically indicate whether the automobile is slowing down or stopping.

A more specific object of the invention is the provision of a signal device which is adapted to be applied to the rear spring suspension of a car or to the mud guard or body, said stop device including a plate having the words "Slow" and "Stop" on the rear face thereof and arranged one above the other, in combination with a swinging shutter which is operatively connected with the brake mechanism so that when the brake is operated the word "Slow" will first appear, as when the car is slowing down by the use of the brakes, or the word "Stop" will appear when the brakes are fully set and the car is stopped.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of an automobile, showing the signal device applied thereto;

Fig. 2 is an enlarged side view of the signal device showing the shutter in normal position by full lines and in partly lowered position by dotted lines to disclose the word "Slow";

Fig. 3 is a rear view of the indicator with the shutter partly broken away;

Fig. 4 is a vertical sectional view showing a hinge construction;

Fig. 5 is a perspective view of the indicator hanging from the vehicle spring instead of being mounted in upstanding position thereon, as shown in Figs. 1 to 4 inclusive; and Fig. 6 is a perspective view of a modification, showing the pendent form of indicator or signal mounted on a transverse spring.

Referring to the drawing, A designates an automobile which has the usual brake mechanism B which latter is employed for operating the shutter 1 of the stop signal or indicator C.

The indicator C comprises a vertical plate or vane 2 which has on its rear face the words "Slow" and "Stop", or the equivalent thereto, the word "Slow" being preferably arranged above the word "Stop". The vane 2 has a forwardly extending lug or tongue 3 at its bottom so as to form means whereby the device can be attached to one of the spring brackets or arms 4 of the automobile, clips 5 being employed to clamp the base member or tongue 3 to the arm 4, as clearly shown in Figs. 2 and 4. Behind the indicator plate 2 is the shutter 1 that is in the form of a plate formed at its lower edge with hinge ears 6 through which extends a pintle 7 carried by the lower part of the vane or plate 2, and on the pintle pin is a torsional spring 8 which has one end 9 engaged with the rear face of the shutter and the other end 10 engaged under the clip. On the shutter 1 is a depending arm 11 by which the shutter is adapted to be operated to open position. In the present instance a wire or equivalent element 12 is connected with the arm 11 and with the lever or clevis 13 of the brake band 14 of the automobile, so that when the driver operates the pedal or lever the wire 12 will be pulled forwardly, which will swing the shutter to the position *a* or *b*, Fig. 3, to disclose the word "Slow" or "Stop", according to the degree to which the brake band is operated for slowing down or stopping the car.

In some cases it is impossible to have the signal device upstanding on the spring suspension system for the body, as shown in Figs. 1 to 4 inclusive, and in this case the signal plate 2 will be formed with a tongue or forwardly projecting member 3ª at the top so as to enable the signal device to be suspended from the vehicle spring c by means of a clip 12, as shown in Fig. 5.

If the signal device is to be mounted on a transverse spring, as shown in Fig. 6, instead of a longitudinal spring, as shown in Fig. 5, the member 3ᵇ at the top of the plate 2 will be formed with laterally extending lugs or ears 13 which engage with clips 14 that secure the signal device to the spring d.

In order to obtain the proper range of movement of the shutter with respect to the brake band lever or clevis 13 the arm 11 of the shutter has a plurality of notches 15 whereby the wire can be connected at different radial distances from the hinge of the shutter to thereby adjust the swinging movement for the purpose of causing the word "Slow" to be exhibited when the shutter is only partially open, as in slowing down the vehicles, or to permit the word "Stop" to be exhibited when the brakes are fully set to stop the vehicle.

From the foregoing description taken in connection with the accompanying drawing, the advantages of the construction and method of operation will be readily understood by those skilled in the art to which the invention appertains, and while I have described the principal embodiment of the invention, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A signal device of the class described comprising a fixed vertical plate bearing signal indicia thereon and having an integral horizontally extending attaching member and also having at the bottom edge hinge eyes, a movable cover plate having at its bottom edge hinge eyes alining with those of the said fixed plate and an arm extending downwardly below the hinge eyes, a pintle extending through the hinge eyes of the two plates, a spring on the pintle to hold up the cover plate in covering relation to the fixed plate and permitting the cover plate to be swung downwardly to uncover the fixed plate, and means adjustably connected with the said arm to operate the cover plate.

2. A signal device of the class described comprising a fixed plate having suitable words thereon, means for attaching the plate to a support, there being pintle eyes on the bottom of the said plate, a cover plate having pintle eyes on its bottom edge, a pintle passing through the eyes, said cover plate having a depending arm provided with spaced notches, means operating on the cover plate to normally hold the same in position to cover the fixed plate, and an operating means engaged with any of the notches on the said arm.

ALFRED A. LITTLE.